United States Patent
Zhang et al.

(10) Patent No.: US 11,422,608 B2
(45) Date of Patent: Aug. 23, 2022

(54) POWER SUPPLY METHOD, ELECTRONIC DEVICE, AND COMPUTER PROGRAM PRODUCT

(71) Applicant: EMC IP Holding Company LLC, Hopkinton, MA (US)

(72) Inventors: Min Zhang, Shanghai (CN); Qiulin Cheng, Shanghai (CN); Haohan Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/197,440

(22) Filed: Mar. 10, 2021

(65) Prior Publication Data
US 2022/0179475 A1 Jun. 9, 2022

(30) Foreign Application Priority Data
Dec. 4, 2020 (CN) .......................... 202011408917.7

(51) Int. Cl.
*G06F 1/32* (2019.01)
*G06F 1/3212* (2019.01)
*G06F 1/26* (2006.01)
*G06F 1/3234* (2019.01)

(52) U.S. Cl.
CPC ............ *G06F 1/3212* (2013.01); *G06F 1/263* (2013.01); *G06F 1/3243* (2013.01)

(58) Field of Classification Search
CPC .................. G06F 1/32; G06F 1/12; G06F 9/44
See application file for complete search history.

(56) References Cited

U.S. PATENT DOCUMENTS

| | | | |
|---|---|---|---|
| 8,595,535 B1 | 11/2013 | Tamilarasan et al. | |
| 9,189,495 B1 | 11/2015 | Hughes et al. | |
| 9,223,500 B1 | 12/2015 | Lemar et al. | |
| 9,417,907 B1 | 8/2016 | Dire et al. | |
| 9,436,693 B1 | 9/2016 | Lockhart et al. | |
| 10,802,815 B1 | 10/2020 | Wang et al. | |
| 10,817,279 B1 | 10/2020 | Wang et al. | |
| 2007/0263416 A1* | 11/2007 | Tsai ...................... | G06F 1/3203 363/21.06 |
| 2015/0008746 A1* | 1/2015 | Youn ........................ | H02J 7/02 307/65 |
| 2016/0118121 A1* | 4/2016 | Kelly .................. | G06F 13/4282 710/301 |
| 2016/0126784 A1* | 5/2016 | Vemula ................... | H02M 3/07 307/66 |
| 2019/0121413 A1* | 4/2019 | Tsai ........................ | G06F 1/263 |

* cited by examiner

*Primary Examiner* — Keshab R Pandey
(74) *Attorney, Agent, or Firm* — BainwoodHuang (57) ABSTRACT

Techniques involve: if it is determined that a power supply level of a processing unit in a normal mode in a computer system is lower than a threshold level, determining the remaining power of a battery backup unit in the computer system; and if it is determined that the remaining power is higher than the threshold power, causing the battery backup unit to supply power to the processing unit to maintain the processing unit in the normal mode. Accordingly, the performance of the computer system can be optimized and stabilized without increasing the hardware cost of the computer system or changing the power supply capability of the computer system, and the user experience of users using the computer system can be improved.

20 Claims, 5 Drawing Sheets

POWER SUPPLY METHOD, ELECTRONIC DEVICE, AND COMPUTER PROGRAM PRODUCT

CROSS-REFERENCE TO RELATED APPLICATION

This application claims priority to Chinese Patent Application No. CN202011408917.7, on file at the China National Intellectual Property Administration (CNIPA), having a filing date of Dec. 4, 2020, and having "A POWER SUPPLY METHOD, AN ELECTRONIC DEVICE, AND A COMPUTER PROGRAM PRODUCT" as a title, the contents and teachings of which are herein incorporated by reference in their entirety.

TECHNICAL FIELD

Embodiments of the present disclosure generally relate to the field of computer systems, and in particular, to a method, an electronic device, and a computer program product for power supply.

BACKGROUND

In the field of computer systems, input/output operations per second (IOPS) are one of the key performance indicators used to measure the performance of, for example, a storage system and a computer system of a device, and customers will always care about the value and stability of the input/output operations per second in the computer system. Generally speaking, the larger the values of the input/output operations per second, the higher the performance of the computer system, and the more stable the values of the input/output operations per second, the more it meets the use requirements of customers. Therefore, it is very important for the computer system to achieve higher and more stable values of input/output operations per second.

Many factors will affect the performance of the computer system and the input/output operations per second thereof. Obviously, the performance and stability of processing units, such as central processing units, dedicated processing units such as graphics processing units (GPUs), and dedicated accelerators such as field programmable gate arrays and application specific integrated circuits, in the computer system are one of the most important factors. However, higher processing unit performance means higher power consumption. Sometimes, because power supply of the computer system is throttled, a processing unit in the computer system may enter an energy-saving mode to reduce the performance of the processing unit by reducing an operation frequency or power of the processing unit, so that the performance of the computer system and the input/output operations per second is reduced. At this moment, the power consumption of the computer system will be reduced and the throttle of the power supply can be canceled. However, the power consumption will rise again after a period of time, and the processing unit will be triggered to enter the energy-saving mode again. The repeated entrance and exit of the energy-saving mode makes the performance of the computer system and the input/output operations per second unstable, thereby reducing the user experience of users who use the computer system.

SUMMARY OF THE INVENTION

The embodiments of the present disclosure provide a method, an electronic device, and a computer program product for power supply.

In a first aspect of the present disclosure, a power supply method is provided. The method includes: if it is determined that a power supply level of a processing unit in a normal mode in a computer system is lower than a threshold level, determining the remaining power of a battery backup unit in the computer system; and if it is determined that the remaining power is higher than the threshold power, causing (e.g., via control signals/commands/instructions/etc.) the battery backup unit to supply power to the processing unit to maintain the processing unit in the normal mode.

In a second aspect of the present disclosure, an electronic device is provided. The electronic device includes: at least one processing unit; and at least one memory that is coupled to the at least one processing unit and stores instructions for execution by the at least one processing unit. The instructions, when executed by the at least one processing unit, cause the device to perform actions including: if it is determined that a power supply level of a processing unit in a normal mode in a computer system is lower than a threshold level, determining the remaining power of a battery backup unit in the computer system; and if it is determined that the remaining power is higher than the threshold power, causing the battery backup unit to supply power to the processing unit to maintain the processing unit in the normal mode.

In a third aspect of the present disclosure, a computer program product is provided. The computer program product is tangibly stored on a non-transitory computer-readable medium and includes machine-executable instructions. The machine-executable instructions, when executed, cause a machine to perform any step of the method described according to the first aspect of the present disclosure.

The Summary of the Invention section is provided to introduce the selection of concepts in a simplified form, which will be further described in the Detailed Description below. The Summary of the Invention section is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent by describing example embodiments of the present disclosure in more detail in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred embodiments of the present disclosure will be described in more detail with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" means "at least one further embodiment." The terms "first," "second," etc. may refer to different or the same objects. Other explicit and implicit definitions may also be included below.

In conventional computer system designs, two or more power supply units (PSUs) are usually used to work together to provide power to at least one computer system. However, once any power supply unit fails or is removed, the remaining power supply units may not be able to provide power that meets the highest power load of the entire computer system. For conventional solutions, if directly increasing the power supply capability of the power supply units is selected, higher hardware costs will be brought to the computer system.

In conventional solutions, the design of a power supply unit allows it to send a power supply unit throttle (PSU_THROTTLE) signal through a micro control unit (MCU) to give a warning and reduce the power consumption of a platform. The power supply unit throttle signal may be transmitted to a processing unit and components thereof through an appropriate external circuit design.

A conventional power supply unit generates a throttle signal to the processing unit through, for example, temperature control signals (PROC_HOT # and MEM_HOT #), and then a processor of the processing unit and a dynamic random access memory (DRAM) work in an energy-saving mode such as a low power consumption mode. However, once the processing unit receives an external throttle signal, the frequency of the processing unit will be reduced to the lowest level. For example, the frequency is switched from 2.2 GHZ to 1.1 GHZ, which means that the performance of the processing unit will be greatly reduced. After an actual power of the processing unit falls within the capability range of the power supply unit, the power supply unit will send a throttle cancellation signal. At this moment, the actual power of the processing unit may rise again. If an input/output load is always maintained at a high level, it will trigger the throttle of the power supply unit again, and another round of throttle is started. Therefore, the actual performance of the processing unit is not stable, and the input/output operations per second will also fluctuate.

It can be seen that in conventional solutions, the performance of the processing unit will be reduced sharply, and the input/output operations per second performance of the entire system will also be reduced. Therefore, the power consumption of the entire computer system may be much lower than the power supply capability of remaining power supply units, which is unnecessary. Therefore, there may be some margins, so that the performance of the computer system can be improved again without reaching an upper limit of the power supply capability of the remaining power supply units. In addition, in conventional solutions, there is also a problem of large jitter differences between the input/output operations per second and the computer system performance.

Specifically, in conventional solutions, when the power supply unit triggers a throttle of the computer system performance, the computer system will not take any active actions to respond to the throttle event to optimize and stabilize the input/output operations per second. In addition, once the processing unit is triggered to be throttled, the performance of the computer system will be greatly reduced, and the input/output operations per second will also be very low. Furthermore, once an external throttling event is removed due to the power consumption of the computer system being reduced far below the power supply capability of the power supply unit, the input/output operations per second of the computer system may be jittered within a relatively large range.

In order to at least partially solve the above problems and one or more of other potential problems, the embodiments of the present disclosure propose a power supply solution. The solution allows a controller such as a baseboard management controller (BMC) to detect and control the power of a battery backup unit in a computer system when the computer system has high power consumption and the power supply capability of a power supply unit for the computer system is deteriorated, so as to additionally use the battery backup unit to supply power to a processing unit of the computer system. Therefore, the solution may optimize the performance of an input/output operations per second when a throttle event occurs, so that the input/output operations per second are optimized and stabilized during running, and the processing unit may work in a stable state when a throttling event occurs, and will not experience fluctuations in the input/output operations per second.

In the embodiments of the present disclosure, the description is given by taking a processing unit as an example, and the processing unit may include a central processing unit, a dedicated processing unit, a dedicated accelerator, etc. However, the protection scope of the present disclosure is not limited thereto, but may be applied to various computing elements, units, modules, or systems that can provide input and output processing capabilities. In addition, in the embodiments of the present disclosure, the computer system may include various systems designed to process input and output operations, such as a storage system and a file system, and the protection scope of the present disclosure is not limited thereto.

Figure 1:
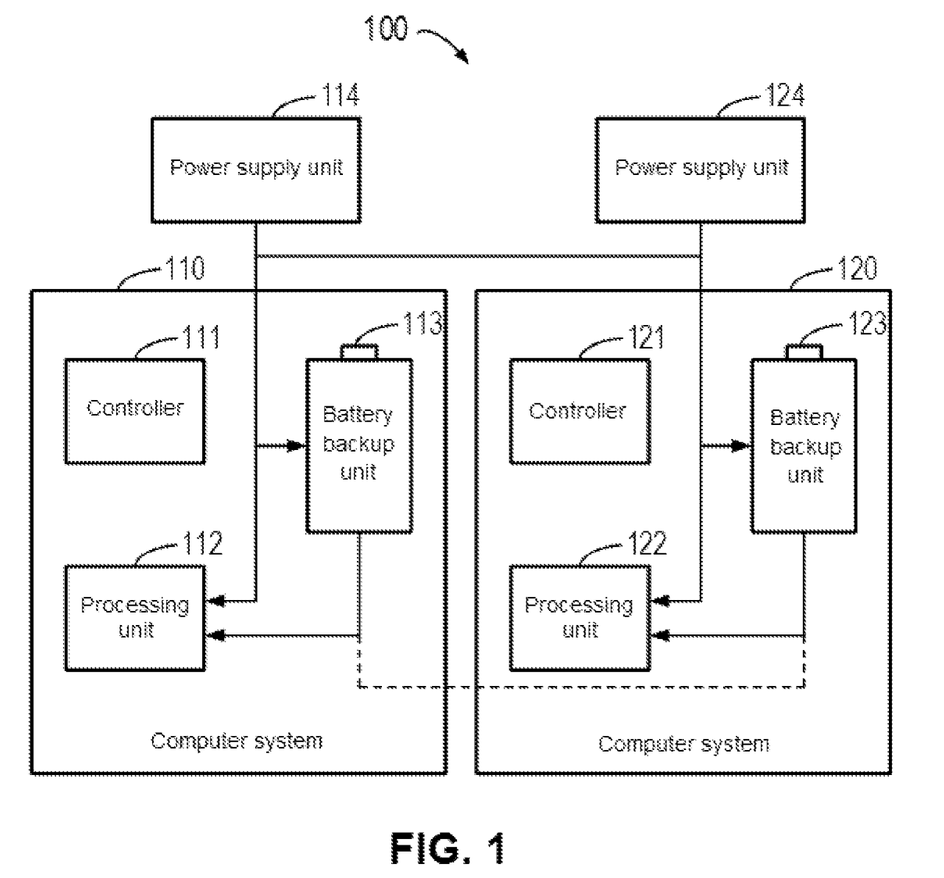
FIG. 1 shows a schematic diagram of example environment 100 in which a device and/or a method according to an embodiment of the present disclosure may be implemented.

FIG. 1 shows a schematic diagram of example environment 100 in which a device and/or a method according to an embodiment of the present disclosure may be implemented. According to an embodiment of the present disclosure, example environment 100 in FIG. 1 includes two computer systems 110 and 120. Computer systems 110 and 120 respectively include controllers 111 and 121, such as a baseboard management controller, processing units 112 and 122, and battery backup units 113 and 123. In addition, computer systems 110 and 120 are both connected to power supply units 114 and 124.

Controllers 111 and 121 may respectively monitor and control signal transmission and power supply in computer systems 110 and 120. In other words, controllers 111 and 121 may respectively monitor and control various key events and logic that may occur in computer systems 110 and 120, so that an accurate and fast response may be made as needed.

For example, controllers 111 and 121 may respectively monitor power supply unit throttle signals sent by power supply units 114 and 124 and used to indicate whether the power supply units are in a throttled state, and may respectively monitor power signals sent by battery backup units 113 and 123 and used to indicate the remaining power of the battery backup units. The power signal may indicate whether a battery backup unit has enough power to ensure that a processing unit can operate in a normal mode for a certain period of time, for example, 60 seconds or a processing cycle, after the battery backup unit supplies power to the processing unit in the computer system.

For another example, controllers 111 and 121 may respectively control processing unit/memory energy-saving signals (CPU_PROCTHOT_N/MEM_HOT_N) sent to processing units 112 and 122 and additional memory controllers associated with the processing units and used to make them enter an energy-saving mode, and may respectively control power supply commands sent to battery backup units 113 and 123 to make them individually or collectively supply power to processing units 112 and 122.

According to the embodiment of the present disclosure, battery backup units 113 and 123 may respectively be on standby in computer systems 110 and 120 until they receive the power supply commands. In addition, the output power and remaining power of battery backup units 113 and 123 may be internally monitored by controllers 111 and 121, respectively. For example, an output current of battery backup units 113 and 123 may be limited to 15 A, and the threshold power of the remaining power may be set to 7 Whr, which is the minimum energy consumption requirement for a processing cycle. In other words, if a computer system needs to draw a current of more than 15 A from a battery backup unit or the remaining power of the battery backup unit is less than or equal to the threshold power of 7 Whr, the battery backup unit will stop or not start supplying power to a processing unit. In addition, computer systems 110 and 120 may appear as a pair, for example, are included in a case, and computer systems 110 and 120 have their own battery backup units 113 and 123, respectively. Therefore, when a throttle event occurs, battery backup units 113 and 123 which each meet the threshold power requirement may collectively supply power to one of processing units 112 and 122, as shown in dashed lines in FIG. 1.

Power supply units 114 and 124 are used to individually or collectively supply power to processing units 112 and 122, and to charge battery backup units 113 and 123 when the power of them is not full. In addition, power supply units 114 and 124 are also used to send power supply unit throttle signals to controllers 111 and 121, respectively.

Processing units 112 and 122 are used to process input and output operations in computer systems 110 and 120, respectively, and enter an energy-saving mode and operate at a relatively low operation frequency when receiving processing unit/memory energy-saving signals. In addition, processing units 112 and 122 may also, for example, avoid sharp changes in the input/output operations per second respectively under the control of controllers 111 and 121 and by smoothly and gradually reducing the operation frequency, so as to provide more stable performance of the computer system and input/output operations per second.

It should be understood that example environment 100 is only illustrative and not restrictive, and it is extensible and scalable. For example, example environment 100 may include more computer systems, and each computer system may include a plurality of processing units and/or power supply units. In addition, example environment 100 may also include only one computer system 110 and power supply unit 114 supplying power thereto, not including computer system 120 and power supply unit 124. Further, the computer system in example environment 100 may also include more processing units and more battery backup units, and the protection scope of the present disclosure is not limited thereto.

Figure 2:
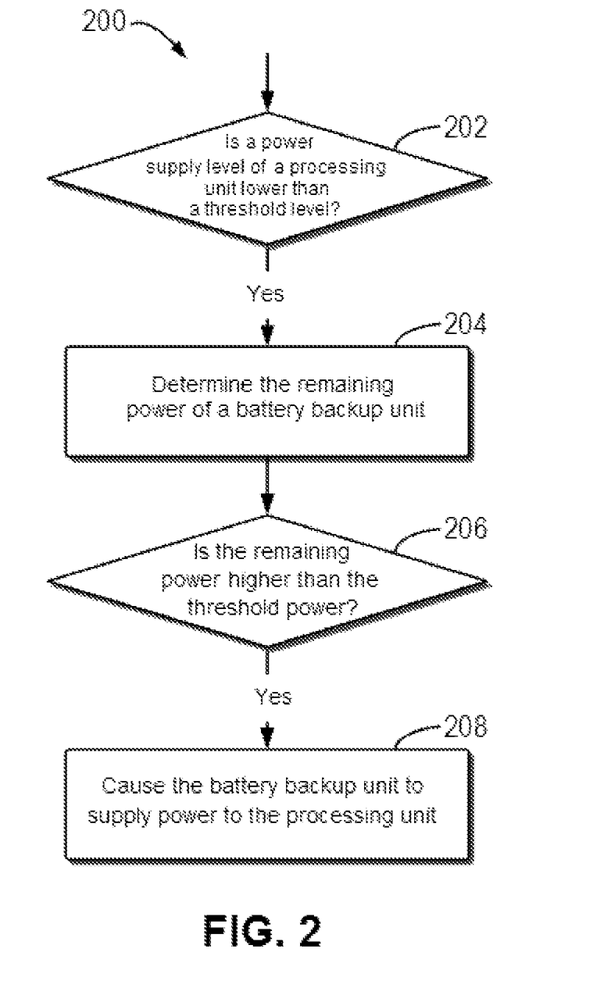
FIG. 2 shows a flowchart of power supply method 200 according to an embodiment of the present disclosure.
Figure 3:
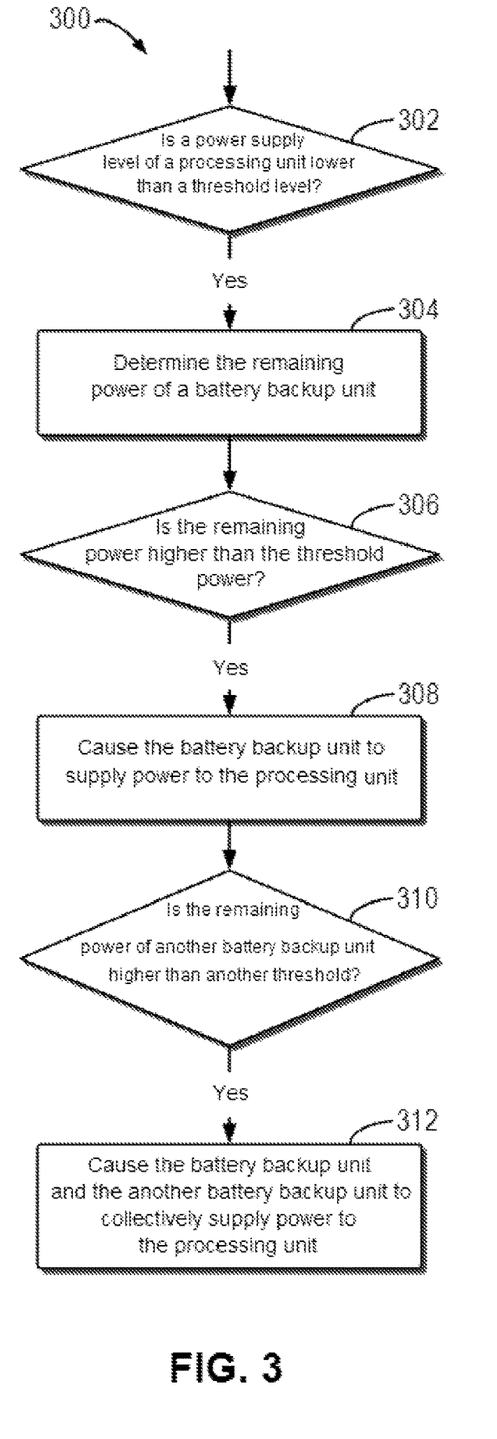
FIG. 3 shows a flowchart of power supply method 300 according to an embodiment of the present disclosure.
Figure 4:
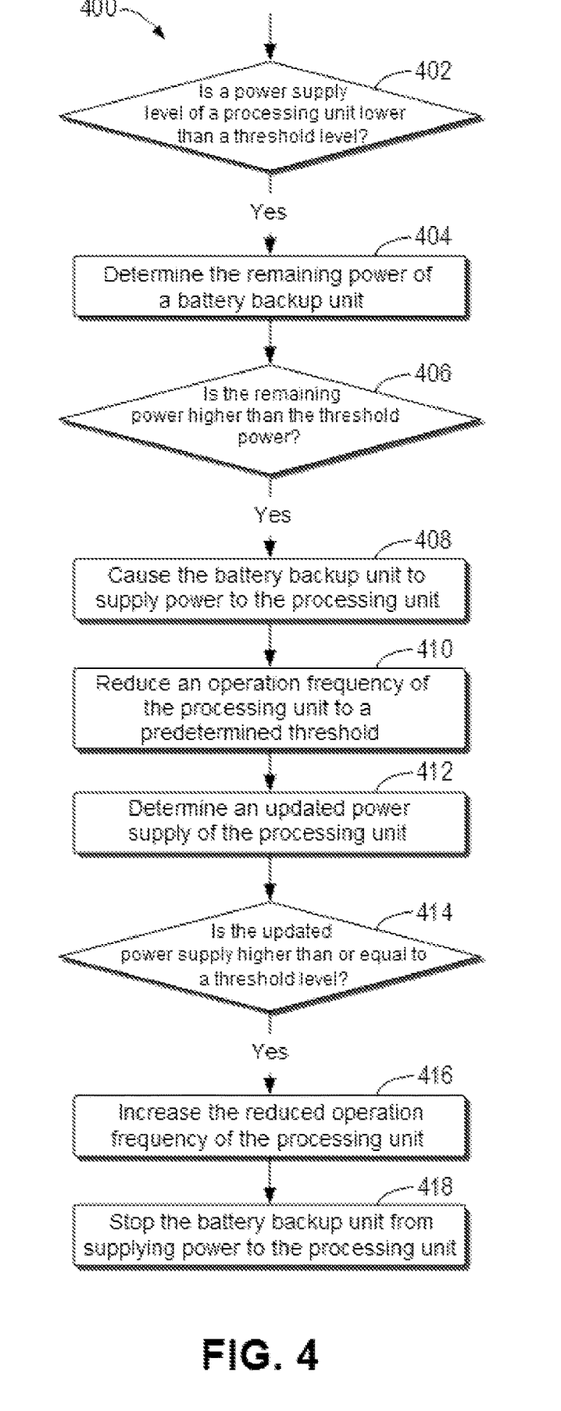
FIG. 4 shows a flowchart of power supply method 400 according to an embodiment of the present disclosure.

The following takes computer system 110 including controller 111, processing unit 112, and battery backup unit 113 and power supply units 114 and 124 for supplying power to computer system 110 as examples to illustrate power supply methods 200, 300, and 400 shown in FIGS. 2, 3, and 4.

FIG. 2 shows a flowchart of power supply method 200 according to an embodiment of the present disclosure. Method 200 may be implemented by controller 111 or controller 121 shown in FIG. 1 or by other appropriate devices. It should be understood that power supply method 200 may also include additional steps that are not shown and/or may omit the shown steps, and the scope of the embodiments of the present disclosure is not limited in this aspect. The following takes controller 111 in FIG. 1 as an example to describe an embodiment about method 200.

At block 202, controller 111 determines whether a power supply of processing unit 112 in a normal mode in computer system 110 is lower than a threshold level. When controller 111 determines that the power supply of processing unit 112 is lower than the threshold level, method 200 proceeds to block 204. According to an embodiment of the present disclosure, the power of processing unit 112 may be provided by power supply units 114 and 124 collectively. When one of power supply units 114 and 124 fails or is removed, the power supply to processing unit 112 will be directly reduced. When the power supply to processing unit 112 is reduced, processing unit 112 may not continue in the normal mode, for example, an original operation frequency or original input/output operations per second vale cannot be maintained.

According to some embodiments of the present disclosure, the threshold level of power supply may include a specific value of power provided to processing unit 112, for example, a power value required for processing unit 112 to remain in the normal mode. According to other embodiments of the present disclosure, the threshold level of power supply may include a ratio to which the power supplied to processing unit 112 is reduced, for example, 60%. According to still other embodiments of the present disclosure, the threshold level of power supply may also include a multiple of power required for processing unit 112 to remain in the normal mode, for example, 1.1 times.

According to an embodiment of the present disclosure, controller 111 may also determine that the power supply of processing unit 112 is lower than a threshold level by monitoring a power supply unit throttle signal that is sent by power supply unit 114 and indicates that power supply unit 114 is in a throttled state.

At block 204, controller 111 determines the remaining power of battery backup unit 113 in computer system 110. According to an embodiment of the present disclosure, controller 111 may monitor the remaining power of battery backup unit 113 by monitoring a power signal that is sent by battery backup unit 113 and indicates the remaining power of battery backup unit 113.

At block 206, controller 111 determines whether the remaining power of battery backup unit 113 is higher than the threshold power. When controller 111 determines that the remaining power of battery backup unit 113 is higher than the threshold power, method 200 proceeds to block 208. According to an embodiment of the present disclosure, battery backup unit 113 (e.g., in response to control signals/commands/instructions/etc. from the controller 111) is used to back up data in a cache of computer system 110 when computer system 110 has insufficient power. However, the total power of battery backup unit 113 is usually greater than power required to back up the data in the cache. Therefore, the remaining power other than the power required to back up the data in the cache in the total power of battery backup unit 113 may be used to supply power to processing unit 112. Therefore, according to an embodiment of the present disclosure, the threshold power is greater than or equal to the power required to back up the data in the cache of computer system 110.

At block 208, controller 111 causes battery backup unit 113 to supply power to processing unit 112 to maintain processing unit 112 in the normal mode. According to an embodiment of the present disclosure, by additionally supplying power to processing unit 112 by battery backup unit 113, the power supply level of processing unit 112 may be caused to be higher than the threshold level. In this case, even if the unfailed or remaining power supply unit in power supply units 114 and 124 sends a power supply unit throttle signal, processing unit 112 may also continue to remain in the normal mode.

FIG. 3 shows a flowchart of power supply method 300 according to an embodiment of the present disclosure. Method 300 may likewise be implemented by controller 111 or 121 shown in FIG. 1 or by other appropriate devices. It should be understood that power supply method 300 may also include additional steps that are not shown and/or may omit the shown steps, and the scope of the embodiments of the present disclosure is not limited in this aspect. Power supply method 300 is a specific implementation of power supply method 200. Similarly, the following takes controller 111 in FIG. 1 as an example to describe an embodiment about method 300.

At block 302, controller 111 determines whether the power supply of processing unit 112 in a normal mode in computer system 110 is lower than a threshold level. The specific content of an action involved in block 302 is the same as that involved in block 202, and will not be repeated here.

At block 304, controller 111 determines the remaining power of battery backup unit 113 in computer system 110. The specific content of an action involved in block 304 is the same as that involved in block 204, and will not be repeated here.

At block 306, controller 111 determines whether the remaining power of battery backup unit 113 is higher than the threshold power. When controller 111 determines that the remaining power of battery backup unit 113 is higher than the threshold power, method 300 proceeds to block 308. The specific content of an action involved in block 306 is the same as that involved in block 206, and will not be repeated here.

At block 308, controller 111 causes battery backup unit 113 to supply power to processing unit 112 to maintain processing unit 112 in the normal mode. The specific content of an action involved in block 308 is the same as that involved in block 208, and will not be repeated here.

At block 310, controller 111 determines whether the remaining power of battery backup unit 123 in computer system 120 paired with computer system 110 is higher than another threshold power. When controller 111 determines that the remaining power of battery backup unit 123 is higher than the another threshold power, method 300 proceeds to block 312. According to an embodiment of the present disclosure, computer systems 110 and 120 are used in pairs, and the power of processing unit 112 may be supplied by power supply units 114 and 124 collectively. Therefore, the remaining power of battery backup unit 123 in computer system 120 other than the power required to back up data in a cache of computer system 120 may also be used to supply power to processing unit 112 in computer system 110. Therefore, according to an embodiment of the present disclosure, the another threshold power is greater than or equal to the power required to back up the data in the cache of computer system 120.

According to some embodiments of the present disclosure, computer systems 110 and 120 may be exactly the same computer system. At this moment, the power required to back up the data in the cache of computer system 110 and the power required to back up the data in the cache of computer system 120 may be equal. Therefore, the threshold power for battery backup unit 113 and the another threshold power for battery backup unit 123 may also be equal.

According to other embodiments of the present disclosure, computer systems 110 and 120 may be different computer systems. At this moment, the power required to back up the data in the cache of computer system 110 and the power required to back up the data in the cache of computer system 120 may be different. Therefore, the threshold power for battery backup unit 113 and the another threshold power for battery backup unit 123 may also be different.

At block 312, controller 111 causes battery backup units 113 and 123 to collectively supply power to processing unit 112 to maintain processing unit 112 in the normal mode. According to an embodiment of the present disclosure, by additionally supplying power to processing unit 112 by battery backup units 113 and 123 collectively, the power supply level of processing unit 112 may be higher than the threshold level, and compared with additionally supplying power by only battery backup unit 113, the power supply level of processing unit 112 may be maintained to be higher than the threshold level for a longer time.

According to an embodiment of the present disclosure, computer system 110 may not only be used as a pair with computer system 120, but may also be used in combination with a plurality of computer systems. In this case, controller 111 may cause battery backup unit 113 of computer system 110 and a plurality of battery backup units of a plurality of other computer systems to collectively supply power to processing unit 112 to maintain processing unit 112 in the normal mode for a longer time.

FIG. 4 shows a flowchart of power supply method 400 according to an embodiment of the present disclosure. Method 400 may likewise be implemented by controller 111 or 121 shown in FIG. 1 or by other appropriate devices. It should be understood that power supply method 400 may also include additional steps that are not shown and/or may omit the shown steps, and the scope of the embodiments of the present disclosure is not limited in this aspect. Power supply method 400 is a specific implementation of power supply method 200. The following takes controller 111 in FIG. 1 as an example to describe an embodiment about method 400.

At block 402, controller 111 determines whether the power supply of processing unit 112 in a normal mode in computer system 110 is lower than a threshold level. The specific content of an action involved in block 402 is the same as the actions involved in blocks 202 and 302, and will not be repeated here.

At block 404, controller 111 determines the remaining power of battery backup unit 113 in computer system 110. The specific content of an action involved in block 404 is the same as the actions involved in blocks 204 and 304, and will not be repeated here.

At block 406, controller 111 determines whether the remaining power of battery backup unit 113 is higher than the threshold power. When controller 111 determines that the remaining power of battery backup unit 113 is higher than the threshold power, method 400 proceeds to block 408. The specific content of the actions involved in block 406 is the same as the actions involved in blocks 206 and 306, and will not be repeated here.

At block 408, controller 111 causes battery backup unit 113 to supply power to processing unit 112 to maintain processing unit 112 in the normal mode. The specific content of the actions involved in block 408 is the same as the actions involved in blocks 208 and 308, and will not be repeated here.

At block 410, controller 111 reduces an operation frequency of processing unit 112 to a predetermined frequency. According to an embodiment of the present disclosure, as power is supplied from battery backup unit 113 to processing unit 112, the remaining power of battery backup unit 113 will gradually decrease. When the remaining power of battery backup unit 113 is reduced to the threshold power, because it is necessary to ensure that battery backup unit 113 can back up the data in the cache of computer system 110 when computer system 110 has insufficient power, battery backup unit 113 will stop supplying power to processing unit 112 at this moment, and processing unit 112 may enter an energy-saving mode. When processing unit 112 enters the energy-saving mode, the operation frequency of processing unit 112 may decrease sharply. Therefore, controller 111 may control processing unit 112 to avoid sharp changes in the input/output operations per second when processing unit 112 enters the energy-saving mode by smoothly and gradually reducing the operation frequency. According to an embodiment of the present disclosure, the predetermined frequency for processing unit 112 may be equal to or greater than the predetermined frequency after processing unit 112 enters the energy-saving mode.

According to an embodiment of the present disclosure, when battery backup unit 113 starts to supply power to processing unit 112 or before battery backup unit 113 supplies power to processing unit 112, controller 111 may determine the power supply duration of battery backup unit 113 based on the remaining power of battery backup unit 113 and the threshold power for battery backup unit 113. According to some embodiments of the present disclosure, when the power supply volume per second of battery backup unit 113 is fixed, controller 111 may determine the power supply duration of battery backup unit 113 based on the remaining power of battery backup unit 113, the threshold power for battery backup unit 113, and the fixed power supply volume per second of battery backup unit 113. According to other embodiments of the present disclosure, the power supply volume per second of battery backup unit 113 may determine the power to be supplied per second by battery backup unit 113 according to a difference between the power supply level of processing unit 112 and the threshold level, and controller 111 may determine the power supply duration of battery backup unit 113 based on the remaining power of battery backup unit 113, the threshold power for battery backup unit 113, and the determined power supply volume per second of battery backup unit 113.

After determining the power supply duration of battery backup unit 113, controller 111 may reduce the operation frequency of processing unit 112 to a predetermined frequency during the power supply duration. According to an embodiment of the present disclosure, controller 111 may reduce the operation frequency of processing unit 112 at a fixed frequency reduction rate, and reduce the operation frequency of processing unit 112 to a predetermined frequency at the time of expiration of the power supply duration or at a predetermined time before expiration. In this way, a more stable computer system and more stable input/output operations per second may be provided.

At block 412, controller 111 determines an updated power supply level of processing unit 112 when battery backup unit 113 supplies power to processing unit 112. According to an embodiment of the present disclosure, when the power of processing unit 112 is supplied by power supply units 114 and 124 collectively and when one of power supply units 114 and 124 fails or is removed, the power supply of processing unit 112 will be reduced. Then, when the failed power supply unit is repaired or the removed power supply unit is reinstalled, the power collectively supplied by power supply units 114 and 124 to processing unit 112 will be increased. At this moment, controller 111 may determine the updated power supply level of processing unit 112. According to an embodiment of the present disclosure, power supply units 114 and 124 may collectively notify controller 111 of the updated power supply level. It is to be noted that the updated power supply level here refers to a level of the updated power supply supplied by power supply units 114 and 124 to processing unit 112, and does not include the level of power supplied by battery backup unit 113 to processing unit 112.

At block 414, controller 111 determines whether the updated power supply level of processing unit 112 is higher than or equal to a threshold level. When controller 111 determines that the updated power supply level is higher than or equal to the threshold level, method 400 proceeds to block 416.

According to an embodiment of the present disclosure, controller 111 may also directly determine that the updated power supply of processing unit 112 is higher than or equal to the threshold level by monitoring a power supply unit throttle signal that is sent by power supply unit 114 or 124 and indicates that power supply unit 114 or 124 ends the throttled state. At this moment, the actions in blocks 412 and 414 may be simplified into the action of determining that the updated power supply is higher than or equal to the threshold level according to the power supply unit throttle signal.

At block 416, controller 111 increases the reduced operation frequency of processing unit 112. According to an embodiment of the present disclosure, when the operation frequency of processing unit 112 is reduced by the action in block 410, as the power supply of processing unit 112 is restored, the reduced operation frequency of processing unit 112 may be increased to be restored to the operation frequency before the reduction, so that processing unit 112 is restored to the normal mode.

At block 416, controller 111 stops battery backup unit 113 from supplying power to processing unit 112. According to an embodiment of the present disclosure, as the power supply of processing unit 112 is restored, supplying power to processing unit 112 by power supply unit 114 alone can ensure that the power supply level of processing unit 112 is higher than or equal to the threshold level. At this moment, battery backup unit 113 does not need to continue to supply power to processing unit 112.

According to an embodiment of the present disclosure, after controller 111 stops battery backup unit 113 from supplying power to processing unit 112, power supply units 114 and 124 may be caused to charge battery backup unit 113 while supplying power to processing unit 112, so that when one of power supply units 114 and 124 fails or is removed again, battery backup unit 113 may supply more power to make processing unit 112 to be in the normal mode for a longer time.

It is to be noted that the operations in blocks 410 and 416 in power supply method 400 are all optional operations, and power supply method 400 may not include operations of reducing and/or increasing the operation frequency of processing unit 112, but battery backup unit 113 may be stopped from supplying power to processing unit 112 only when the updated power supply of processing unit 112 is higher than or equal to the threshold level.

Related content of example environment 100 in which a device and/or a method according to an embodiment of the present disclosure may be implemented, power supply method 200 according to an embodiment of the present disclosure, power supply method 300 according to an embodiment of the present disclosure, and power supply method 400 according to an embodiment of the present disclosure have been described above with reference to FIGS. 1 to 4. It should be understood that the above description is to better demonstrate the content recorded in the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes may be arbitrarily set as needed without affecting the normal implementation of the embodiments of the present disclosure.

Through the description above with reference to FIGS. 1 to 4, the technical solutions according to the embodiments of the present disclosure have many advantages over conventional solutions.

For example, with the technical solution of the present disclosure, the performance of a computer system and input/output operations per second may be optimized and stabilized without increasing hardware costs of the computer system or changing the power supply capability of the computer system, and especially when the computer system may be triggered to enter an energy-saving mode, the performance of the computer system may be made more stable, thereby improving the user experience of users who use the computer system.

In one example, a manner in which only battery backup unit 113 supplies power to processing unit 112 is adopted when a throttle event occurs. Battery backup unit 113 has a continuous power output capability of up to 350 W, and when battery backup unit 113 is fully charged, a power of 20 Whr may be supplied. Since the threshold power for the remaining power is 7 Whr, battery backup unit 113 may supply power to processing unit 112 for the power supply duration of at least (20−7)Whr*3600 s/350 W=133 seconds. In another example, if battery backup units 113 and 123 collectively supply power to processing unit 112 when a throttle event occurs, the duration of supplying power to processing unit 112 may be doubled, which may reach 133*2=266 seconds. As long as the failed power supply unit is repaired or the removed power supply unit is reinstalled during the aforementioned power supply period, it can be ensured that processing unit 112 is continuously in the normal mode without affecting the input/output operations per second performance of computer system 110 and processing unit 112.

Figure 5:
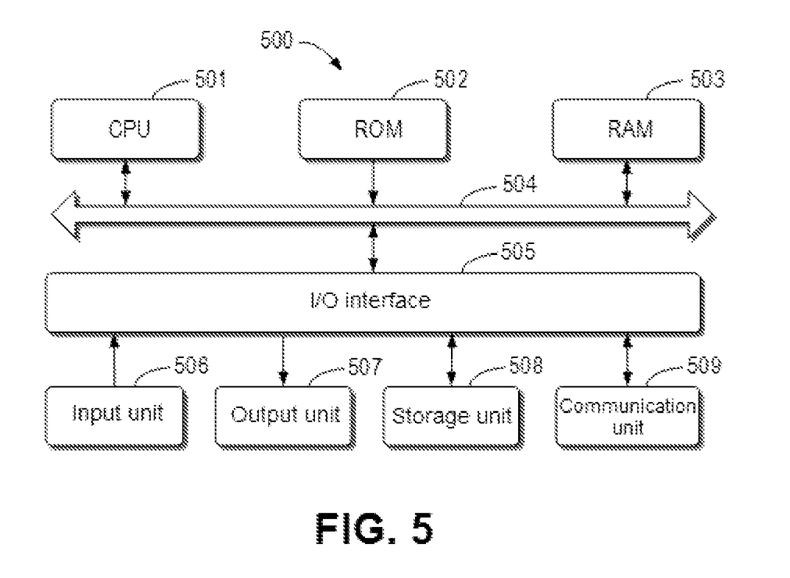
FIG. 5 shows a schematic block diagram of example device 500 that may be used to implement an embodiment of the present disclosure.

FIG. 5 shows a schematic block diagram of example device 500 that may be used to implement an embodiment of the present disclosure. According to the embodiment of the present disclosure, controller 111 or 121 in FIG. 1 may be implemented by device 500. As shown in the figure, device 500 includes central processing unit (CPU) 501 that may perform various appropriate actions and processing according to computer program instructions stored in read-only memory (ROM) 502 or computer program instructions loaded from storage unit 508 into random access memory (RAM) 503. In RAM 503, various programs and data required for the operation of storage device 500 may also be stored. CPU 501, ROM 502, and RAM 503 are connected to each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, such as methods 200, 300, and 400, may be performed by processing unit 501. For example, in some embodiments, methods 200, 300, and 400 may be implemented as a computer software program that is tangibly included in a machine-readable medium such as storage unit 508. In some embodiments, part or all of the computer program may be loaded and/or installed to device 500 via ROM 502 and/or communication unit 509. One or more actions of methods 200, 300, and 400 described above may be performed when the computer program is loaded into RAM 503 and executed by CPU 501.

The embodiments of the present disclosure may relate to a method, a device, a system, and/or a computer program product. The computer program product may include a computer-readable storage medium on which computer-readable program instructions for performing various aspects of the embodiments of the present disclosure are carried.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples, as a non-exhaustive list, of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage media used herein are not to be interpreted as transient signals per se, such as radio waves or other freely propagating electromagnetic waves, electromagnetic waves propagating through wave guides or other transmission media, for example, light pulses through fiber optic cables, or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user's computer over any kind of networks, including a local area network (LAN) or a wide area network (WAN), or may be connected to an external computer, for example, connected through the Internet by using an Internet service provider. In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the embodiments of the present disclosure.

Various aspects of the embodiments of the present disclosure are described here with reference to the flowcharts and/or block diagrams of the methods, the devices/systems, and the computer program products according to the embodiments of the present disclosure. It should be understood that each block of the flowcharts and/or block diagrams and combinations of blocks in the flowcharts and/or block diagrams can be implemented by computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A power supply method, comprising:
if it is determined that a power supply level of a processing unit in a normal mode in a computer system is lower than a threshold level, determining the remaining power of a battery backup unit in the computer system;
if it is determined that the remaining power is higher than the threshold power, causing the battery backup unit to supply power to the processing unit to maintain the processing unit in the normal mode; and
reducing an operation frequency of the processing unit to a predetermined frequency;
wherein reducing the operation frequency of the processing unit to a predetermined frequency comprises:
determining the power supply duration of the battery backup unit based on the remaining power of the battery backup unit and the threshold power; and
reducing the operation frequency of the processing unit to the predetermined frequency during the power supply duration.

2. The method according to claim 1, wherein the threshold power is greater than power required to back up data in a cache of the computer system.

3. The method according to claim 1, wherein causing the battery backup unit to supply power to the processing unit comprises:
determining that the remaining power of another battery backup unit in another computer system paired with the computer system is higher than another threshold power; and
causing the battery backup unit and the another battery backup unit to collectively supply power to the processing unit to maintain the processing unit in the normal mode.

4. The method according to claim 3, wherein the threshold power is equal to the another threshold power.

5. The method according to claim 1, further comprising:
determining an updated power supply level of the processing unit during the period when the battery backup unit supplies power to the processing unit; and
if it is determined that the updated power supply level is higher than or equal to the threshold level, increasing the reduced operation frequency of the processing unit.

6. The method according to claim 1, further comprising:
determining an updated power supply level of the processing unit during the period when the battery backup unit supplies power to the processing unit; and
if it is determined that the updated power supply level is higher than or equal to the threshold level, stopping the battery backup unit from supplying power to the processing unit.

7. The method according to claim 1, further comprising:
collectively supplying power to the processing unit from a power supply unit of the computer system and another power supply unit from another computer system that is different from the computer system.

8. The method according to claim 1, further comprising:
prior to causing the battery backup unit to supply power to the processing unit, providing charge to the battery backup unit from a power supply unit of the computer system and another power supply unit from another computer system that is different from the computer system.

9. An electronic device, comprising:
at least one processing unit; and
at least one memory that is coupled to the at least one processing unit and stores instructions for execution by the at least one processing unit, wherein the instructions, when executed by the at least one processing unit, cause the device to perform actions comprising:
if it is determined that a power supply level of a processing unit in a normal mode in a computer system is lower than a threshold level, determining the remaining power of a battery backup unit in the computer system;
if it is determined that the remaining power is higher than the threshold power, causing the battery backup unit to supply power to the processing unit to maintain the processing unit in the normal mode; and
reducing an operation frequency of the processing unit to a predetermined frequency;
wherein reducing the operation frequency of the processing unit to a predetermined frequency comprises:
determining the power supply duration of the battery backup unit based on the remaining power of the battery backup unit and the threshold power; and
reducing the operation frequency of the processing unit to the predetermined frequency during the power supply duration.

10. The electronic device according to claim 9, wherein the threshold power is greater than power required to back up data in a cache of the computer system.

11. The electronic device according to claim 9, wherein causing the battery backup unit to supply power to the processing unit comprises:
determining that the remaining power of another battery backup unit in another computer system paired with the computer system is higher than another threshold power; and
causing the battery backup unit and the another battery backup unit to collectively supply power to the processing unit to maintain the processing unit in the normal mode.

12. The electronic device according to claim 11, wherein the threshold power is equal to the another threshold power.

13. The electronic device according to claim 9, wherein the operation further comprises:
determining an updated power supply level of the processing unit during the period when the battery backup unit supplies power to the processing unit; and
if it is determined that the updated power supply level is higher than or equal to the threshold level, increasing the reduced operation frequency of the processing unit.

14. The electronic device according to claim 9, wherein the operation further comprises:
determining an updated power supply level of the processing unit during the period when the battery backup unit supplies power to the processing unit; and if it is determined that the updated power supply level is higher than or equal to the threshold level, stopping the battery backup unit from supplying power to the processing unit.

15. A computer program product having a non-transitory computer readable medium which stores a set of instructions that, when carried out by computerized circuitry, causes the computerized circuitry to perform a method of:
  in response to determining that a power supply level of a processing unit in a normal mode in a computer system is lower than a threshold level, determining the remaining power of a battery backup unit in the computer system;
  in response to determining that the remaining power is higher than the threshold power, causing the battery backup unit to supply power to the processing unit to maintain the processing unit in the normal mode; and
  reducing an operation frequency of the processing unit to a predetermined frequency;
wherein reducing the operation frequency of the processing unit to a predetermined frequency comprises:
  determining the power supply duration of the battery backup unit based on the remaining power of the battery backup unit and the threshold power; and
  reducing the operation frequency of the processing unit to the predetermined frequency during the power supply duration.

16. The computer program product according to claim 15, wherein the threshold power is greater than power required to back up data in a cache of the computer system.

17. The computer program product according to claim 15, wherein causing the battery backup unit to supply power to the processing unit comprises:
  determining that the remaining power of another battery backup unit in another computer system paired with the computer system is higher than another threshold power; and
  causing the battery backup unit and the another battery backup unit to collectively supply power to the processing unit to maintain the processing unit in the normal mode.

18. The computer program product according to claim 17, wherein the threshold power is equal to the another threshold power.

19. The computer program product according to claim 15, further comprising:
  determining an updated power supply level of the processing unit during the period when the battery backup unit supplies power to the processing unit; and
  if it is determined that the updated power supply level is higher than or equal to the threshold level, increasing the reduced operation frequency of the processing unit.

20. The computer program product according to claim 15, further comprising:
  determining an updated power supply level of the processing unit during the period when the battery backup unit supplies power to the processing unit; and
  if it is determined that the updated power supply level is higher than or equal to the threshold level, stopping the battery backup unit from supplying power to the processing unit.

* * * * *